(12) United States Patent
Chandrasekaran et al.

(10) Patent No.: US 10,722,803 B2
(45) Date of Patent: Jul. 28, 2020

(54) INTEGRATED CHAT AND GAME PLAY PLATFORM

(71) Applicants: Deepak Murali Chandrasekaran, Belmont, CA (US); Jessica Kung, Redwood City, CA (US)

(72) Inventors: Deepak Murali Chandrasekaran, Belmont, CA (US); Jessica Kung, Redwood City, CA (US)

(73) Assignee: Roblox Corporation, San Mateo, CA (US)

( * ) Notice: Subject to any disclaimer, the term of this patent is extended or adjusted under 35 U.S.C. 154(b) by 66 days.

(21) Appl. No.: 15/433,604

(22) Filed: Feb. 15, 2017

(65) Prior Publication Data
US 2018/0229128 A1    Aug. 16, 2018

(51) Int. Cl.
*A63F 13/00* (2014.01)
*A63F 13/87* (2014.01)
*A63F 13/35* (2014.01)
*A63F 13/795* (2014.01)

(52) U.S. Cl.
CPC ............ *A63F 13/87* (2014.09); *A63F 13/35* (2014.09); *A63F 13/795* (2014.09); *A63F 2300/572* (2013.01)

(58) Field of Classification Search
CPC ............ A63F 2300/556; A63F 2300/87; A63F 13/795; A63F 13/86
See application file for complete search history.

(56) References Cited

U.S. PATENT DOCUMENTS

| | | | | |
|---|---|---|---|---|
| 8,621,585 | B2* | 12/2013 | Danieli | H04L 12/1818 713/150 |
| 2006/0025216 | A1* | 2/2006 | Smith | A63F 13/12 463/35 |
| 2009/0164639 | A1* | 6/2009 | Sylvain | H04L 65/104 709/227 |
| 2010/0332842 | A1* | 12/2010 | Kalaboukis | G06F 17/30867 713/186 |
| 2015/0375102 | A1* | 12/2015 | George | A63F 13/00 463/24 |

* cited by examiner

*Primary Examiner* — Omkar A Deodhar
*Assistant Examiner* — Eric M Thomas
(74) *Attorney, Agent, or Firm* — Donald R. Boys; Central Coast Patent Agency LLC

(57) ABSTRACT

A system incorporates a managing server executing software on a processor, game servers serving video games, a plurality of network-connected mobile computerized appliances in use by persons to play games served by the game servers; and software executing on processors of the computerized appliances. Software at the computerized appliances provides interactive interfaces, enabling a first player launch a chat session through the managing server with one or more other players, enabling any one of the players in a chat session to associate a game served by one of the one or more game servers with the chat session, and enabling players in the chat session to enter the game associated with the chat session, and to leave the game and return to the chat session.

19 Claims, 5 Drawing Sheets

INTEGRATED CHAT AND GAME PLAY PLATFORM

BACKGROUND OF THE INVENTION

1. Field of the Invention

The present invention is in the field of online game play including three dimensional and virtual reality (VR), and pertains more particularly to methods and apparatus for on-demand game access and play from a chat interface.

2. Discussion of the State of the Art

In the field of online gaming, three dimensional (3D) and two dimensional (2D) games including VR environments may be provided to online players (game site) through one or more network-based game engines and servers, typically cloud servers. Gaming Website players may download an application that synchronizes with the Web site to update a player's device with new games, and current games that may be selected from within the application through device input to establish a game session with the server hosting the selected game. Players, who may be registered players of a service, may also access games from email, the Website, or anywhere a game link might be supported in media.

It is known to the inventors that players at a gaming site may link up and become friends and may message and chat with one another using native and or provided chat software to interact through invitations to chat. A player may invite another chat player in session to play a game and may send a game link to one or more other players asking them to join through the chat interface. Once a player joins a game from a chat session the player is launched (redirected) to the game server. If a player leaves a game, he or she lands back in the chat session whether the session has expired (no one present) or not (at least one player present).

It is desired that any hosted game or VR world or environment be engaged by more players for more playtime. It has occurred to the inventors that game patronization might be associated with player chat such that game play may occur synchronously with chatting.

Therefore, what is clearly needed is a method and apparatus for seamless integration of game play and chat activity through a gaming Website.

BRIEF SUMMARY OF THE INVENTION

In one embodiment of the invention a system is provided, comprising a network-connected managing server executing first software on a processor from a non-transitory medium, one or more game servers serving video games on the network, a plurality of network-connected mobile computerized appliances, each having a display screen, in use by persons, termed players, to play games served by the one or more game servers, and second software executing on processors of the network-connected computerized appliances. The second software provides interactive interfaces on the display screens on individual ones of the network-connected mobile computerized appliances, the interfaces enabling a first player using a first one of the network-connected mobile computerized appliances to launch a chat session through the managing server with one or more other players using others of the network-connected mobile computerized appliances, enabling any one of the players in a chat session to associate a game served by one of the one or more game servers with the chat session, and enabling players in the chat session to enter the game associated with the chat session, and to leave the game and return to the chat session.

In one embodiment one of the interactive interfaces provided on a display of a network-connected mobile computerized appliance, provides an application and configuration screen to the player using that appliance, the application and configuration screen providing at least interactive inputs for launching a chat session, and for inviting other players to chat. Also in one embodiment the application and configuration screen further provides links to data stored at the management server regarding friends and other players registered at the management server, as candidates for chat. Also in one embodiment the application and configuration screen further provides links enabling the player launching chat session to enable game play through the chat session, and to select any variable settings.

In one embodiment of the system, once a chat session is launched, an interactive chat screen is displayed to all players active in the chat session, indicating players in the chat, and interactive inputs are provided in the chat screen for joining a game associated with the chat session, and for associating the chat session with a new game. Also in one embodiment, once the input for associating the chat session with a new game is selected, an interactive game-selection interface is displayed, with interactive indicia representing games that may be selected for association with the chat session. In one embodiment the interactive indicia representing games are displayed in a sort order according to specific criteria. In one embodiment inputs are displayed for choosing the criteria by which games to play are sorted. In one embodiment, the chat screen has a wallpaper background specific to the game associated with the chat. And in one embodiment, once the join interactive input is selected, the player is launched into the associated game, displayed on the display screen.

In one embodiment of the invention the game screen includes interactive links to return to the chat session displaying the chat screen. And in one embodiment players in the chat session that do not select to join the game associated with the chat session, are enabled to watch the game being played while still engaged in the chat session.

In another aspect of the invention a method is provided, comprising launching a chat session by a first player using a network-connected mobile computerized appliance having a display screen, by selecting Chat in an application and configuration screen displayed by second software executing on a processor of the network-connected mobile computerized appliance, accessing contacts for eligible players by the first player through a network-connected management server executing first software on a processor from a non-transitory medium, selecting individual ones of the player contacts, sending invitations to chat to the players selected, associating a video game, served by a network-connected game server, with the chat session by the first player or any other player accepting the invitation and entering the chat session, joining the associated video game by individual ones of the players in the chat session by selecting a Join input, and switching between chat and game play arbitrarily by individual ones of the players.

In one embodiment of the method a step is further provided for configuring and launching a chat session through an application and configuration screen, and inviting other players by selection to chat. In one embodiment, a step is further provided for linking to data stored at the management server regarding friends and other players registered at the management server, as candidates for chat.

In one embodiment a step is further provided for enabling game play through the application and configuration screen, and for selectin any variable settings.

In one embodiment of the method a step is further provided for entering a game by a player in the chat session by selecting an interactive input, and for associating a new game with the chat session by another interactive input.

In one embodiment, once the input for associating the chat session with a new game is selected, an interactive game-selection interface is displayed, with interactive indicia representing games that may be selected for association with the chat session. A step may be included for displaying the interactive indicia representing games in a sort order according to specific criteria.

IN one embodiment of the method a step is included for displaying inputs for choosing the criteria by which games to play are sorted. Also in one embodiment, the chat screen displays a wallpaper background specific to the game associated with the chat. In one embodiment, a step is included for launching a player into a specific game associated with the chat by selection of a Join input displayed on the display screen. In one embodiment, a step is included for selecting to return to the chat session displaying the chat screen. And in one embodiment a step is included for displaying the game to players in the chat session, not in the game.

DETAILED DESCRIPTION OF THE INVENTION

In various embodiments described in enabling detail herein, the inventors provide a unique system for accessing and playing games from within a chat application. The present invention is described using the following examples, which may describe more than one relevant embodiment falling within the scope of the invention.

Figure 1:
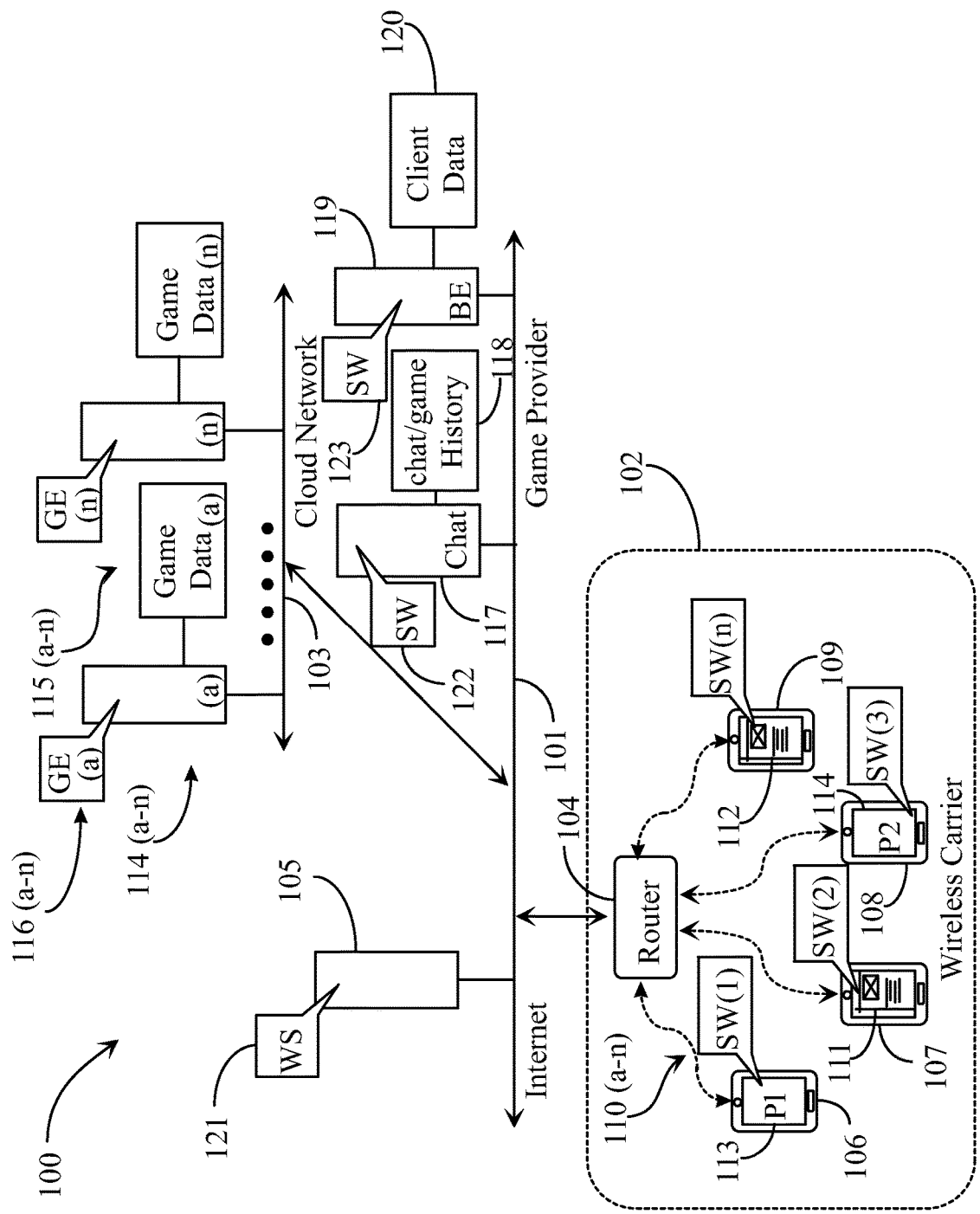
FIG. 1 is an architectural overview of a gaming network supporting gaming from chat, according to an embodiment of the present invention.

FIG. 1 is an architectural overview of a communications network 100 supporting gaming from chat, according to an embodiment of the present invention. communications network 100 includes an Internet network represented herein by a network backbone 101. Network backbone 101 represents all of the lines, equipment, and access points that make up the Internet network as a whole, including any connected sub-networks. Therefore, there are no geographic limitations to the practice of the present invention.

Internet 101 may be a wide area network (WAN) other than the Internet without departing from the spirit and scope of the present invention. For example, network 101 may be a corporate WAN. In one embodiment, network 101 may be a municipal area network (MAN). The inventors choose the Internet network as a preferred example of a WAN because of the wide public access characteristics. IN various embodiments of the invention, devices 106 through 109 may be executing software, indicated here as SW(1) through SW(n), which is an application provided by the game provider, enabling the devices to operate in chat sessions and in game-play sessions, either simultaneously or by switching between the modes.

Communications network 100 includes a wireless carrier network 102. Wireless carrier network 102 may be a cellular network with a router 104 providing connection and bridging to Internet 101. In this example, there are several mobile communications devices, in this case smart phones, 106, 107, 108, and 109 representing users having connection through their devices (106 through 109) to Internet 101 through router 104 and wireless carrier network 102. Mobile devices 106 through 109 are not limited to being smart phones, but may be any communications device capable of accessing the Internet, playing online games, and engaging in messaging, particularly chat messaging.

Internet backbone 101 supports a Web server 105. Web server 105 may host Web sites for enterprises such as Web site (WS) 121. WS 121 may be a gaming enterprise Web site 121 may be operated by a game provider as an access point for clients, generally referred to herein as game site players or players. Users operating phones 106 through 109 may be referred to as game site players. WS 121 may be operated by a game provider adapted to provide online games stored on a cloud network represented herein by a cloud network backbone 103 having connection to backbone 101.

Cloud backbone 103 represent connectivity and network support for multiple cloud servers 114 (a-n). Cloud servers 114 (a-n) each host at least one game engine (GE) such as game engines 116 (a-n). Cloud servers 114 (a-n) have connection to data repositories 115 (a-n). Data repositories 115 (a-n) are adapted to store game data and information for service. There may be one or more than one cloud server and associated game engines and data repositories without departing from the spirit and scope of the present invention.

The game provider may maintain at least one back-end (BE) server 119 having connection to Internet backbone 101. WS 121 may be maintained by the game providing entity through BE server 119 executing appropriate software (SW). Server 119 has connection to a data repository 120. Repository 120 includes client data for players of the game site (WS 121) such as the players operating devices 106 through 109 as players. Client data may include playership data, financial account data, etc. Repository 120 may also include client or player activity logs and history of activity on the Web site and in gaming, and communications, particularly chat with other players.

In this embodiment, a chat server 117 is provided and has connection to Internet backbone 101. Chat server 117 represents any chat server that may host chat sessions between players on game site 121. Chat server 117 may be maintained by the game provider entity, or it might be maintained by a third-party enterprise without departing from the spirit and scope of the present invention. Chat server 117 includes SW 122 adapted as a SW extension of gaming site 121. SW 122 may enable server 117 to host special chat sessions where players may chat with one another and launch and play games from the game provider network without leaving chat sessions in which they may be engaged.

BE server 119 includes a SW application 123. SW 123 provides mapping, tracking, and channel switching control for game site players engaged in chat activity and game selection and play from devices such as network-connected devices 106 through 109. Devices 106 through 109 each have a SW game application referenced herein as SW 110 (1-n). SW (1-n) may represent a downloaded game application that may be downloaded from the game provider through WS 121 to improve the gaming experience on the mobile device. More specifically, a player may configure gaming settings and options on the mobile device and may access games through the game application and through a designated chat application that may be accessed from within the gaming application or accessed as a standalone chat application that may be integrated with the gaming application on board the device.

Mobile devices 107 and 109 have associated chat interfaces 111 and 112 open and actively engaged in chat. Mobile devices 106 and 108 have game play interfaces (PI) 113 and PI 114 open and are actively engaged in play of a game served from one or more of cloud servers 114 (a-n). In one embodiment, the game play interfaces and the chat interfaces are launched from the same game or chat application on the player's device. For example, a game application may also include the chat interface and a native chat interface may be adapted by SW to include the game-play interface.

In general use of the present invention, a game site player may download a game application from WS 121 on server 105. For example, device 106 has SW 110 (a) operating thereon. The player may configure a chat-messaging interface within the game application that leverages the chat platform used by the gaming-provider-hosted sessions held in chat server 117 executing SW 122. For example, a player may choose to configure the chat interface to automatically support game selection launch and play. In one embodiment, the player may simply enable or disable the feature in the chat interface. In another implementation, a player may download a game application that includes one or more extensions for integrating to a native chat platform the player prefers. Server 117 may be adapted to support via SW 122 a variety of different chat platforms.

Once the player has configured chat to support game play, the player may initiate a chat session with one or more other players that may be online. An option to add a game to the initiated chat session may be included in such as the first chat screen. In this way, games available to the players and stored in cloud network 103 may be accessed through the chat screen by clicking on a game link embedded in the chat screen. A player may initiate a game and invite one or more players engaged in the chat session to play the game. In one implementation one chat session may be linked to a single game where the chat initiator has the opportunity to select the game and invite others to play the game. In a variation of this implementation, a chat participant other than the initiator may opt to replace a game that is currently linked to the chat session.

In one implementation, SW 123 executed and running on BE server 119 may track the server activity of WS 121 and of chat server 117 using the data to determine when to launch a player into a game from chat, when to serve a game list to a player for game selection, and when to transport a player back into the chat session after the player determines to leave the game. In this example, players operating device 107 and 109 are engaged in chat represented by chat screen 111 (on device 107) and chat screen 112 (on device 109).

Each of these players may click on a game invite sent from the chat server into the instant chat screen and join the game. In this case, they are transported into the game (switched to game channel) if they click on the game link. BE server running SW 123 may toggle channels for a player according to the activity of the player in chat. For example, in any one active chat session there may be two or more players and a single online game available for play that has been selected by the initiating player of the chat session. The selection may be made from within the chat application interface from a chat screen listing the games that may be available for selection. The list of available games may be altered as to sort, such as recent games played, popular games, most played games, war games, and so forth. Game lists may be ordered by search as well.

When any player in chat clicks on a game invitation link, the player is launched directly into the selected game but does not lose his or her connection to the chat session. Rather the game is served to the player device from the cloud 103, over the Internet 101 through router 104, and over the wireless network to the connected device. When a player leaves a game he or she immediately resumes chat. In one implementation, it is possible that a player plays a game longer than a chat session is active. For example, everyone else leaves the chat room. A game may continue as long as there are the sufficient minimum number of players engaged in the game.

Any player may join more than one chat interaction running concurrently and therefore may have immediate access to more than one game since there is one game presented within each chat session. The player may select any of more than one game invitations to immediately be launched into that game. There may be a priority rule that results in the player being tied to the chat session of the game he or she joined such that the session is prioritized over the other open chat sessions the player may be listed in.

In one implementation, when a player, such as player using device 106, clicks on a game invitation link presented in the chat screen, and is subsequently launched into the game, they may continue to chat with the other players through the original chat interface or from within the game itself, if the game supports active chat between players. In this example players using devices 106 and 108 are playing games 113 (P1 and P2). In one implementation, other players of a same and active chat session may decide to add a game replacing a game that is currently running or advertised in the current chat screen.

In a variation of the above embodiment there may be one or more rules governing when or if a game available through the chat session may be replaced by another player's selected game. For example, if a minimum number of players in the chat are engaged in playing the game, it may survive until the number drops to below a minimum number of players to play the game. At this point another player may determine to select a different game and invite the others to play that game. Likewise, when the number of players in active chat falls below a minimum of two, then the chat session may be rendered inactive, although the last player may still be visible in the chat screen and may in fact continue the session by inviting one or more other players to resume chatting. That player might then select another game to initiate from chat when the minimum number of players have accepted.

Still further to the above, a player may force replacement of a game initiated by another player if the new player's game has more players (chat players) that accepted the in-line invitation than those who are playing the current game. In such a case, there may be only one game invitation link visible at any time in a player's chat screen. For example, if a game is ongoing, but a participant player does not accept the invitation after a set period, the invitation link may disappear from the chat screen. A separate game invitation link may appear if a different game is selected. In this way, the accessibility of a game from a chat session may be regulated by rules as well as by ability of a newer chat participant to switch out an existing game with a different game. In one implementation, there may be more than one game, such as two games, for example, active in one chat session, provided enough players are in the chat to properly populate both games. At such a point the chat session may divide and become two separate chat sessions each having one active game.

It may also be the case that games to which a player may link from within a chat session are active games running in the cloud and having other players engaged that are not part of the instant chat environment of the player that selected the game. In one embodiment, games may have relevancy to chat subjects or to the ages of the chat participants, etc. Therefore, content of served game materials might be monitored via SW or a human moderator to prevent inappropriate games from being linked to a current chat session based on what is known about the chat players. There are many possibilities.

In an alternative embodiment, players in the chat session that do not select to join the game associated with the chat session, are enabled to watch the game being played while still engaged in the chat session.

Figure 2:
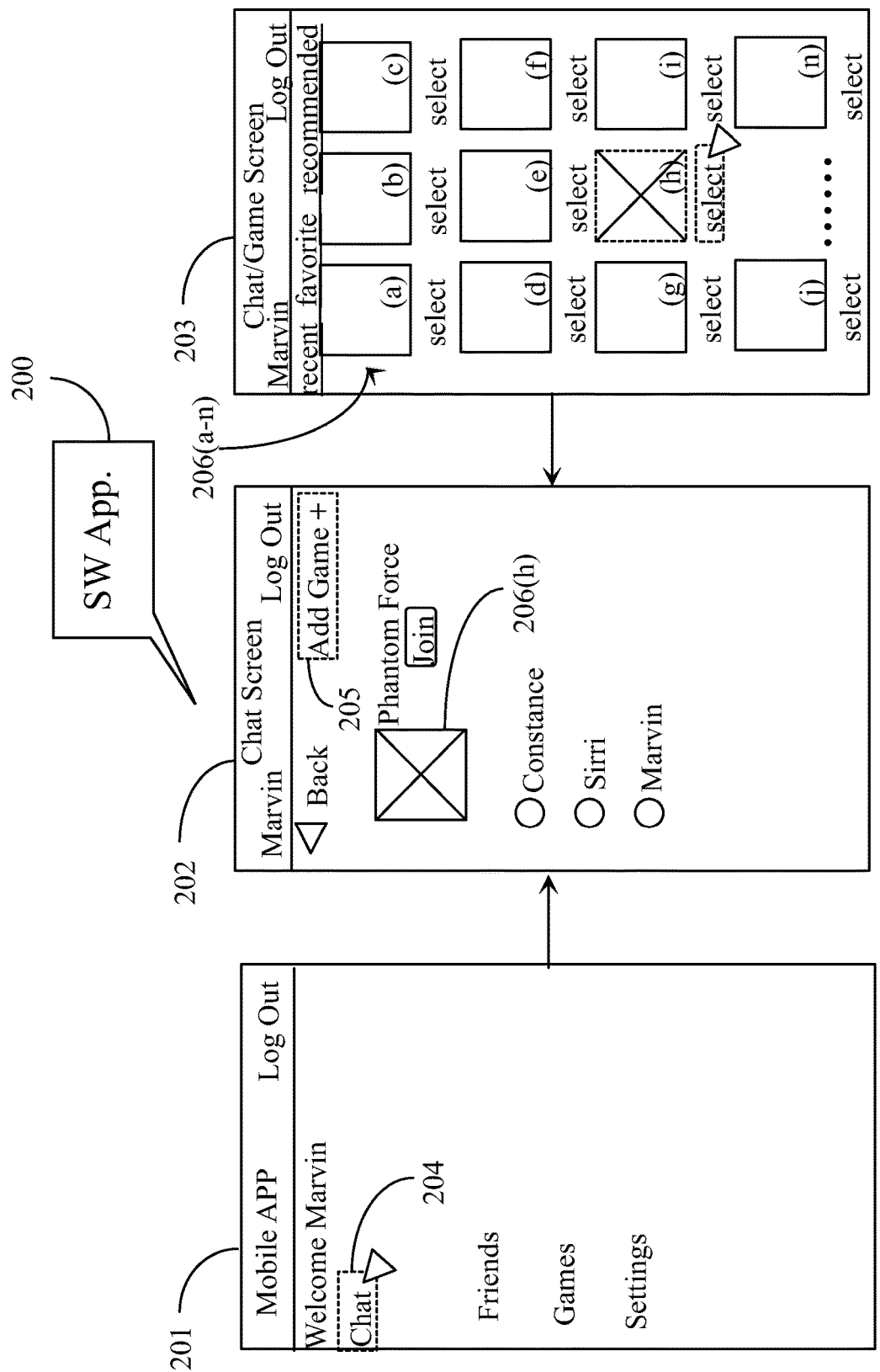
FIG. 2 is a collective view of mobile application screen shots depicting game selection from within a chat application, according to an embodiment of the present invention.

FIG. 2 is a collective view of screen shots of different displays on a mobile device, such as a smart phone, depicting game selection, and switching between chat and game functionality, from within a mobile application according to an embodiment of the present invention. The smart phone providing these displays may be one of devices 106 through 109 depicted in FIG. 1, and SW App. 200 may be SW (1-n) depicted in FIG. 1. SW 200, executing on the device, provides the interactive screens and the functionality. Application 200 in one embodiment is a gaming application that includes an embedded chat application and interface. An application and configuration screen 201 may be provided, that enables a player to see friends lists, games lists, and to configure preferences and settings. In this example, mobile application and configuration screen 201 includes an option 204 for invoking chat.

Selection of chat option 204 may bring up a screen 202 dedicated to chat functionality. Chat screen 202, which may be displayed in consequence of selecting Chat in screen 201, may include a Back button for navigating back to the game application screen. Chat screen 202 includes a link 205 for adding a game. In this example the game added is Phantom Force 206(h). Game 206(h) may be selected from a game presentation screen 203, presenting game links 206 (a-n). Game presentation screen 203 includes options in this example for presenting game links according to several different criteria. For example, game links 206 (a-n) may be most recent games played, favorite games of the requesting player, games recommended by the game provider, and so on. In one implementation, a game search interface (not illustrated) might be provided to search games by keyword or phrase. When a player selects a game link in screen 203, it appears on chat screen 202 as, in this case, an executable play link to Phantom Force.

In one embodiment, the chat server may automatically send a game invitation to join game 206h to all of the other players engaged in the same chat as the player that selected the game. In another embodiment, once the game is added, the adding player may select which of the other chat participants to which the game invitation will be propagated. Selection of link 206(h) may automatically transport a player into the active game running on a server in the cloud network. Once a player is playing the game, he or she may toggle back into the active chat session by invoking a back to chat link that may be provided on a game screen or menu bar. In various embodiments, players may easily switch between chat and game play.

In one implementation, the gaming mobile application 200 incorporates both the gaming functionality and the chat functionality. In one variation, a player may continue chatting with the other players of the chat session through the game screen while the player is engaged in playing the game. In another implementation, a player who joins a game temporarily leaves chat while playing but retains a busy presence state in the chat interface indicating that the player is playing the game.

In one embodiment of the invention a frame or other graphic of the game associated with a chat session, to which chat participants may switch, will be used as wallpaper in the background of the interactive screens provided by the mobile software. Also in one embodiment, a chat participant who does not elect to enter the game associated with the chat, may still observe the game being played by other participants as players.

Rules may be created within the mobile application for moderating, for example, who may select games in a chat, how many games may be available in a single session, when an existing game may be replaced with another, etc. In one embodiment, only one game is available from a chat session and players may join a chat session to play that game or move to another chart session to play a different game. In one embodiment, any player may, while in chat, change a game being played from that chat session by simply selecting the game from a list and inviting the other players to play it. In such a circumstance, the players playing the current game may be able to keep playing that game until they determine to exit back into the chat session, where they may join the new game being played. If they do not want to join the new game they may leave the current chat and join another chat that is playing another game. In one embodiment, a player may have more than one chat session open but may only play one of the games associated.

Figure 3:
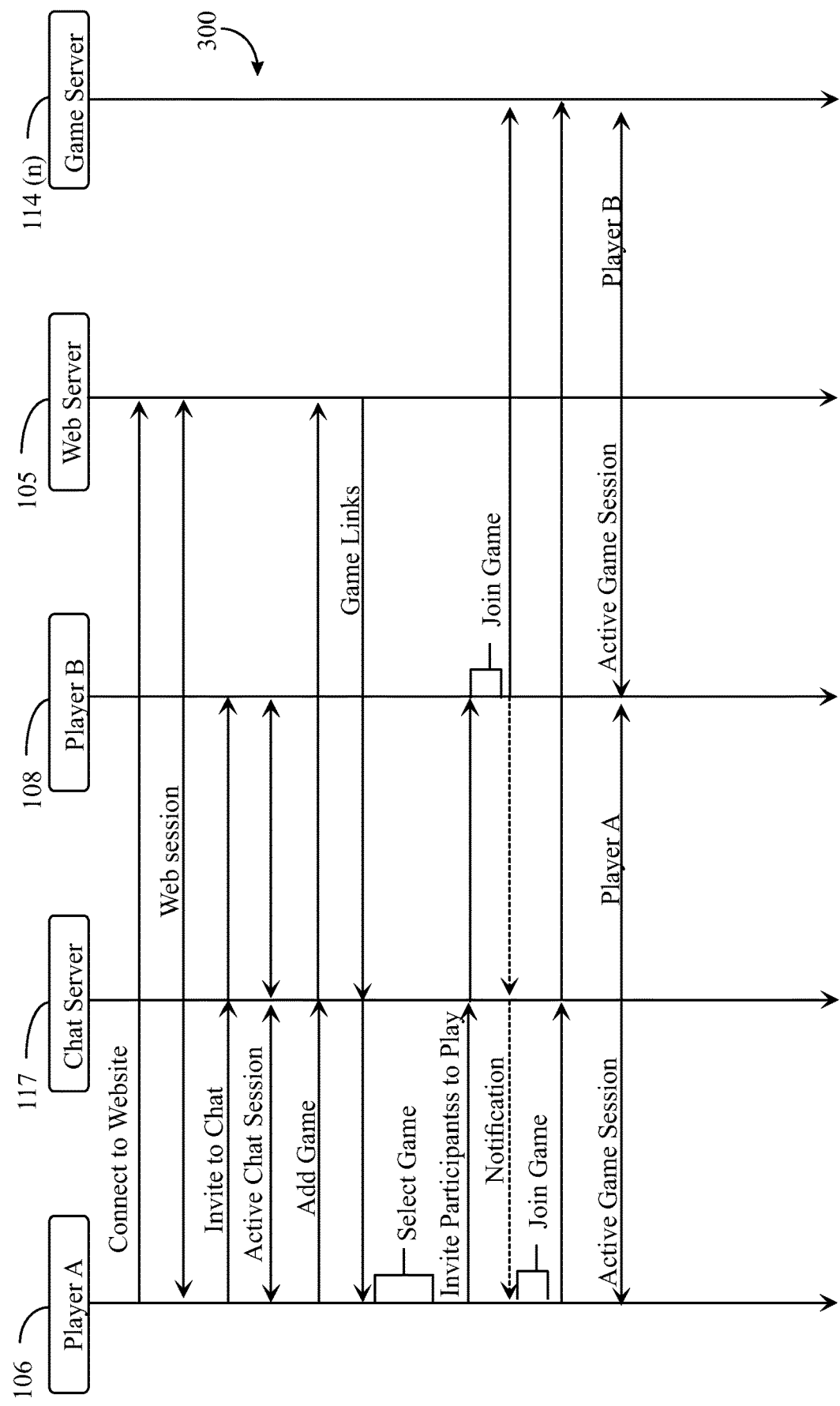
FIG. 3 is an interaction sequence diagram depicting a process for establishing a game session from a chat platform.

FIG. 3 is an interaction sequence diagram 300 depicting a process for establishing a game session from a chat platform. Sequence diagram 300 depicts a player A operating smart phone 106 as depicted in FIG. 1. Player A may use phone 106 to connect to the game site hosted on server 105 as depicted in FIG. 1. A Web session is then established between the player and the server hosting the game Website.

Player A may then click on a chat link and select at least one other player, in this case player B operating device 108, as depicted in FIG. 1, with whom to chat, the active session and invitation brokered by a chat server like chat server 117 depicted in FIG. 1. Once an active session is open between the chat server and player devices (player A and player B) either player has opportunity to associate a game to the session. In this case Player A determines to add a game (Add Game button 205 in FIG. 2). In one embodiment, the chat session is opened when at least one other player is invited and joins the chat before a game is selected. In one embodiment, a player may add the game before inviting others to chat.

Player A may, from within the chat interface, click on an option for adding a game. This option causes a list of game links to be sent into the session on a separate screen (203) for selection. The game list may be custom ordered, randomly put together or suggested/recommended by the game site, or a combination of criteria. A player may search games using a search interface provided. In this example, the games list comes from the game site (WS) on server 105 as depicted in FIG. 1.

Player A may browse through the games list and may select a game from within the chat interface. Once a game is associated with the chat session it may then be made visible to and available to any player that is in the chat session. Once a game is selected Player A may invite one or more other players to play the game. In this sequence, Player A has established the game to play before inviting any chat players to join the game. Player A invites, in this case player B, to join the selected game represented by a game link sent to player B as a chat message. Player B joins the game by selecting the game link. It is noted herein that chat server 117 brokers all interactions and sets up the game session from within the server. Notification from the game server that player B joined the game may be sent back to the chat server and player B.

Player A may join the game and an active game session between the players may be established, the session brokered by the game server hosting the selected game. It is noted herein that the chat server is adapted by SW to handle brokering of the chat session and of establishing the requests to the game server and Web server on behalf of the chat players. SW executing on the mobile devices provides the integration between the platforms (chat and gaming) through a single application which may be a gaming application that includes a chat interface or through a native chat interface that has been adapted by the SW to broker the game play selection and initiation services. However, in this example, the chat server (117) does not broker the gaming feeds, rather the actual game session is brokered by the game server.

If a player leaves the game, the player may be transported back into the chat session that has remained open during the time of the gaming session. In one embodiment, the chat session between the active players may continue as part of the gaming session if the game selected supports chat messaging between players. In one embodiment, players who leave a game may be switched back to the original chat session through which the game was accessed, though it is possible that the session will remain a shell until more than one player lands back in chat, at which point it will be active again. If only a single player lands back in chat, the player could resume the session by inviting at least one other player to join the chat. Other rules for moderating chat and game access may be created. In one embodiment games played in a chat session may be contextually relevant to a theme of the chat, for example. Different chat groups may be set up for players who have different levels of experience with a particular popular game, for example. There are many possibilities.

Figure 4:
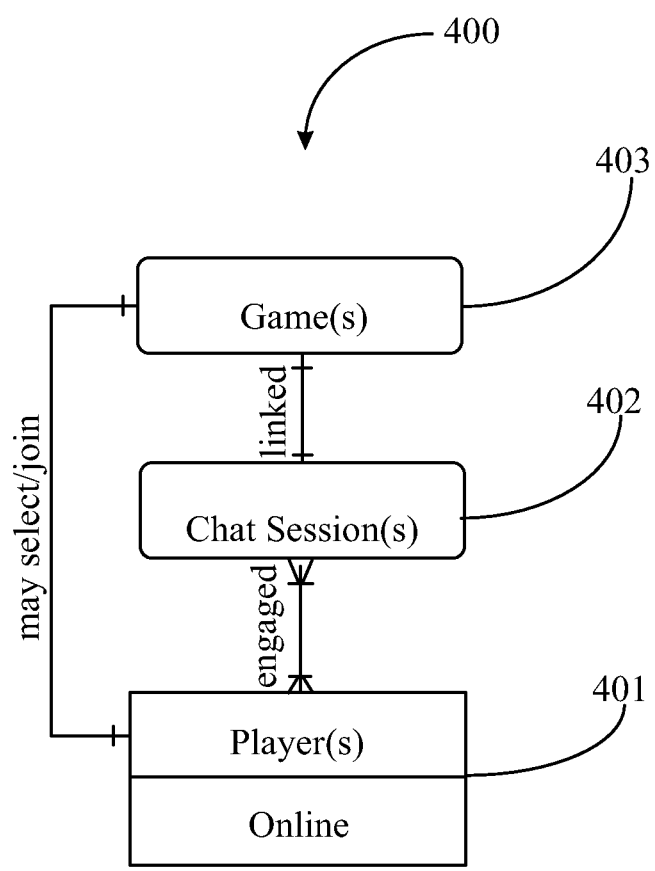
FIG. 4 is a model language diagram of a gaming and messaging system, according to an embodiment of the present invention.

FIG. 4 is a model language diagram of a gaming and messaging system model 400 according to an embodiment of the present invention. Model 400 includes a player or players 401 in a state of connectivity online through a mobile device, such as a smart phone analogous to one of devices 106 through 109 of FIG. 1. Player(s) 401 may be engaged in a Chat session or sessions 402.

Chat session or sessions 402 are each linked or otherwise associated with a game or games 403 on a one session per game instance association. It is noted that in one embodiment, a same game may be linked to more than one chat session but a chat session may be at any one time linked to a single game instance. In another embodiment, there may be a provision for linking more than one game into a single chat session without departing from the spirit and scope of the present invention.

Player or players 401 may each select a single game to link to a chat session. Likewise, each player may join (play) a single game through a chat session. In this example, a player may only select or join a game through a chat session. A player may move between one or more than one chat session, each associated with an available game. When a player leaves a game he or she may be switched back to the chat session. More attributes may be added to model 400 without departing from the spirit and scope of the present invention, and many variations of the abstract model may be envisioned without departing from the spirit and scope of the present invention.

Figure 5:
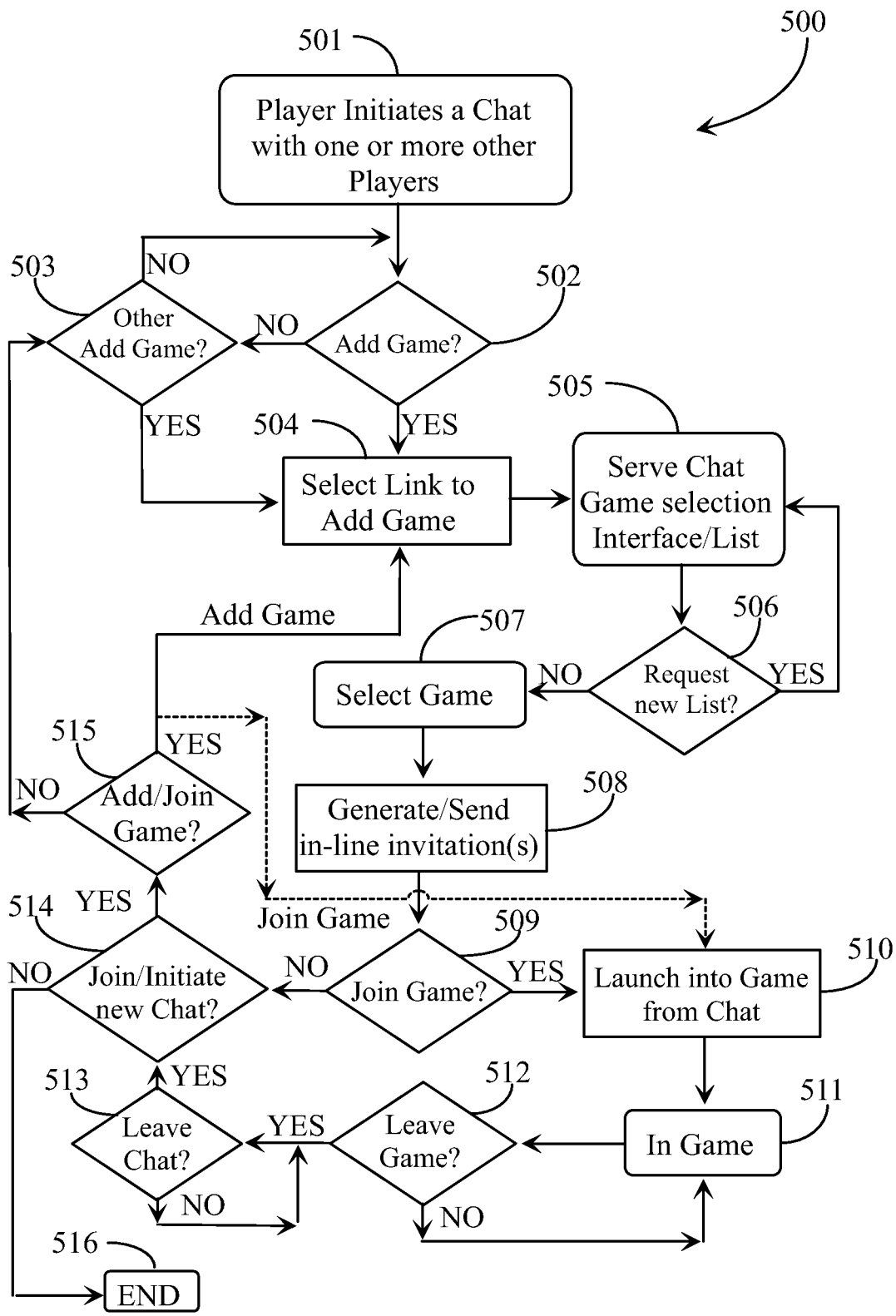
FIG. 5 is a process flow chart depicting steps depicting interaction with a gaming system from a chat platform.

FIG. 5 is a process flow chart 500 depicting steps for interaction with a gaming system from a chat platform in an embodiment of the invention. At step 501 a game-site player initiates a chat session with one or more other game-site players online. It may be assumed for this example that the initiating player is connected online with the game site though a mobile device and has selected a chat option while working within a mobile game application installed on the mobile device. However, the device type being a mobile smart phone analogous to one of devices 106 through 109 of FIG. 1 should not be construed as a limitation to practice of the present invention, as other mobile and cabled computing devices may be used to practice the invention in alternative embodiments.

At step 502, the chat-initiating player may decide whether or not to add a game to the chat session. If the initiating player decides not to add a game at step 502, another player in the chat session may determine whether or not to add a game at step 503. If no players determine to add a game, then the process may loop back until someone in the session decides to add a game. Otherwise the chat session may operate as a normal chat session until such time that a game is added. If a player determines to add a game at step 503, or if the initiating player determines to add a game at step 502, the process moves to step 504 wherein that player may click on a link to add a game.

In one aspect of the process, there may be a time period within which the opportunity to add a game to the chat session is available to the initiating player. After such a period expires, any other player that is in the chat session may add a game on a first-action bases. A time period may also be imposed on game life in the chat session, controlling how long a selected game may remain linked to the particular chat session. Also, a game association to the chat session may be required to remain the rule for a minimum time. In one aspect, after a first game is linked to a chat session, any other player may opt to switch the game with another game, based on first action of the player.

Each player in the chat session may see the link to add a game. If a player selects the add game option in step 504, a request may be sent from the chat server to a second server that has all of the available games listed. This may be a server associated with the game website, such as a back-end server analogous to server 119 running SW 123 in FIG. 1. At step 505 a game list and interface for selecting a game may be served to the requesting chat player. The selection interface may consist of a chat screen having the requested links listed according to player preferences. That is to say a player may order a custom game link list or may accept a suggested sort that might be determined by the system for the player. For example, the list may include the most recent games added to chat by the player in the past, or the games that are most popular or most played. The system may recommend games according to player profile and information known about the player including game-play history.

At step 506 the player adding the game may make a decision to reorder a games list according to another system-provided sort, or may also initiate a search of available games according to keywords or phrases (search criteria) entered into a search interface that might also be provided on the games link screen served to the chat session. If at step 506 the player determines to request a new list, the process may loop back to step 505 where the server may aggregate the new links for the list according to the request input including search terms. If at step 506 the player determines not to request a different list or link sort, the player may select one of the presented game links at step 507.

At step 508, inline game invites may be sent to the other players in chat automatically as a result of game selection. In one aspect, the selecting player may invite all or some or one other player in the chat session. In one aspect, game invitations may be manually sent as chat messages. In one aspect, an invitation list of the other players in chat is presented to the selecting player and the player my check or select player(s) from the list wherein those selected players see the invites as a new message and a join or play link to the player-selected game.

At step 509, any invited player in the chat session may determine whether or not to join the game. If a player determines to join a selected game at step 509, the player selects join or play and is launched into the game from chat at step 510, and may be considered in the game (Active) at step 511. In one aspect, the player in a game at step 511 may still retain his or her place in the chat session and presence information available to other chat participants may indicate the state of in-game or playing a game. In another aspect, the player may be able to continue chatting with at least the other players from the chat session who are also playing the same game.

At step 512, a player that is currently in a game may determine whether or not to leave or exit the game. This determination may occur without any warning at any time during the player's time in play. If the player determines not to leave the game the process loops back to step 511 (in game). If at step 512 the player determines to leave or exit the game, then the player may exit and return to the active chat session. In one aspect, if the chat session has expired because the player was the last participant, the player might revive the session by inviting another player to the chat. Assuming the chat is still active the player may resume chatting.

At step 513, the player leaving the game and returning to chat may make a determination of whether or not to leave the current chat session. If the player determines not to leave the current session the player remains in chat. If the player determines to leave the current chat session at step 513, the player may decide whether to join or initiate a new chat. If the player decides not to initiate or join a new chat session the process may end for that player at step 516. If the player determines to join or initiate a new chat session, the player may, after doing so, determine whether to add or join an existing game that has already been added by another player in the chat at step 515.

If at step 515 the player decides to join the game already associated with the new chat session, the process may resolve back to step 510, whereupon the player may be automatically launched into the game from the new chat session. If at step 515 the player determines to add a game, the process may move back to step 504 whereby the player may select the add game link to contact (brokered by chat) a list server for a list of games. If at step 515, the player determines not to add or join a game from the new chat session, the process may resolve back to step 503 where other players may determine whether to add a game.

In one aspect of process 500, a group of players who all join the same game from the same chat session may continue chatting within a game lobby connected to the game. In another aspect once a player selects a game to play the existing chat room turns into a game lobby for the selected game. The lobby may essentially be a familiar background screen from the game. There may also be added interactive options that may enable potential players in chat to review rules, procedure for playing, etc. A join or play button may be visible in the lobby to every chat player.

It will be apparent to one with skill in the art that the chat/game play system of the present invention may be provided using some or all of the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

The invention claimed is:

1. A system, comprising:
   a network-connected managing server executing first software on a processor from a non-transitory medium;
   a game server serving video games on the network;
   a plurality of network-connected computerized appliances each having a processor, a display screen and input mechanisms; and
   second software executing on the processors of the network-connected computerized appliances;
   wherein the second software executing on the processors of the network-connected computerized appliances interacts with the first software executing on the processor of the network-connected managing server, providing interactive interfaces on the display screens of individual ones of the network-connected computerized appliances,
      a first one of the interactive interfaces being a chat screen displayed after a chat session is launched enabling a player to conduct chat correspondence with other players having computerized appliances connected to the managing server, the chat screen displaying identification of players in the chat session and displaying links enabling a player in the chat session to join a game served by the game server,
      a second one of the interactive interfaces being a screen displaying graphic links to games served by the game server, and
      a third one of the interactive interfaces being a game play interface enabling the player to participate in the game, wherein a player in a chat session with one or more other players is enabled to select the game that is then associated with the chat session, to issue invitations to other players in the chat session to join the selected game, with a link enabling chat participants to enter the selected game from the chat session and return to the chat session from the selected game, and wherein players who are invited but decline to join the game are enabled to watch the game being played while still in the chat session.

2. The system of claim 1, wherein the interactive interfaces further include a fourth interactive interface that includes an application and configuration screen, the application and configuration screen providing at least interactive inputs for launching the chat session, and for inviting other players to chat.

3. The system of claim 2 wherein the application and configuration screen further provides links to data stored at the management server regarding friends and other players registered at the management server, as candidates for chat.

4. The system of claim 2 wherein the application and configuration screen further provides links enabling the player launching the chat session to enable game play through the chat session, and to select variable settings.

5. The system of claim 1 wherein the chat screen has a wallpaper background specific to the game associated with the chat.

6. The system of claim 1 wherein, once a displayed link is selected, the player is launched into the associated game wherein the game is associated with the selected link and is displayed on the display screen.

7. The system of claim 6 wherein the game as displayed on the display screen includes interactive links to return to the chat session that displays the chat screen.

8. A method, comprising:
- launching a chat session by a first player using a network-connected mobile computerized appliance having a display screen, by selecting Chat in an application and configuration interactive interface displayed by second software executing on a processor of the network-connected mobile computerized appliance;
- accessing contacts for eligible players to chat by the first player through a network-connected management server executing first software on a processor from a non-transitory medium;
- selecting individual ones of the contacts and sending invitations to chat to the players selected;
- associating a video game, served by a network-connected game server, with the chat session by the first player or another player that accepted the invitation and entered the chat session;
- displaying a graphic link for the video game on an interactive chat interface;
- listing identification of players in the chat session in the interactive chat interface;
- selecting a game to play by at least one player in the chat session, and in response to selection of the game, issuing respective invitations to other players in the chat session to join the game selected;
- joining the selected game by individual ones of the players in the chat session by accepting the invitation to play;
- switching between chat and game play arbitrarily by individual ones of the players by selecting graphic links in the interactive chat interface and a gameplay interface; and
- enabling one or more players in the chat session that decline the invitation to join the selected game to watch the selected game being played while the one or more players are in the chat session.

9. The method of claim 8 further comprising providing an application and configuration screen that enables configuring and launching the chat session, and inviting other players by selection to chat.

10. The method of claim 9 further comprising linking to data stored at the management server regarding friends and other players registered at the management server, as candidates for chat.

11. The method of claim 9 further providing enabling game play through the application and configuration screen.

12. The method of claim 9 further comprising enabling one or more of the players in the chat session to enter the selected game by selecting an interactive input, and to associate a new game with the chat session by another interactive input.

13. The method of claim 12 wherein, once the input for associating the chat session with the new game is selected, an interactive game-selection interface is displayed, with interactive indicia representing games that may be selected for association with the chat session.

14. The method of claim 13 wherein the interactive indicia representing games are displayed in a sort order according to specific criteria.

15. The method of claim 14 further comprising displaying inputs for choosing the criteria by which games are sorted.

16. The method of claim 12 wherein the chat screen displays a wallpaper background specific to the game associated with the chat.

17. The method of claim 12 further comprising a player into a specific game associated with the chat by selection of a Join input displayed on the display screen.

18. The method of claim 8 further comprising providing a user interface enabling one or more players playing the selected game to return to the chat session displaying the chat screen.

19. The method of claim 12 including displaying the game to players in the chat session that are not in the game and that have declined an invitation to play.

* * * * *